United States Patent
Shah et al.

(10) Patent No.: US 11,283,387 B2
(45) Date of Patent: Mar. 22, 2022

(54) CURRENT SENSE CIRCUIT WITH ALTERNATING MEASUREMENT PATHS

(71) Applicant: TEXAS INSTRUMENTS INCORPORATED, Dallas, TX (US)

(72) Inventors: Krushal Shah, Dallas, TX (US); Mayank Garg, Murphy, TX (US); Ganapathi Hegde, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 16 days.

(21) Appl. No.: 16/849,680

(22) Filed: Apr. 15, 2020

(65) Prior Publication Data

US 2021/0328536 A1     Oct. 21, 2021

(51) Int. Cl.
*H02P 27/08*     (2006.01)
*H02P 6/28*     (2016.01)
*H02M 7/5387*     (2007.01)

(52) U.S. Cl.
CPC ........ *H02P 27/08* (2013.01); *H02M 7/53875* (2013.01); *H02P 6/28* (2016.02)

(58) Field of Classification Search
CPC ...................................................... H02P 23/14
See application file for complete search history.

(56) References Cited

U.S. PATENT DOCUMENTS

| | | | | |
|---|---|---|---|---|
| 4,695,941 A * | 9/1987 | Kumar | ...................... | B60L 3/12 700/45 |
| 5,821,713 A * | 10/1998 | Rolling | ...................... | H02P 6/18 318/400.32 |
| 7,903,008 B2 * | 3/2011 | Regier | ............... | G01R 31/2841 341/142 |
| 8,957,700 B2 * | 2/2015 | Nelson | ............... | H03K 19/0005 326/30 |
| 9,618,540 B2 * | 4/2017 | Yang | ...................... | H02M 3/158 |
| 9,831,808 B1 * | 11/2017 | Takai | ...................... | H02P 6/183 |
| 10,222,402 B2 * | 3/2019 | Varsha | ...................... | H03F 3/68 |

* cited by examiner

*Primary Examiner* — Antony M Paul
(74) *Attorney, Agent, or Firm* — Mark Allen Valetti; Charles A. Brill; Frank D. Cimino (57) ABSTRACT

A system includes a motor and a motor controller coupled to the motor. The motor controller includes a current sense circuit configured to: receive a first phase current sense measurement on a first measurement path; receive the first phase current sense measurement on a second measurement path; receive a second phase current measurement on the first measurement path; receive the second phase current on the second measurement path; average the first phase current sense measurement on the first measurement path with the first phase current sense measurement on the second path; and average the second phase current sense measurement on the first measurement path with the second phase current sense measurement on the second path.

18 Claims, 7 Drawing Sheets

CURRENT SENSE CIRCUIT WITH ALTERNATING MEASUREMENT PATHS

BACKGROUND

The proliferation of electronic devices and integrated circuit (IC) technology has resulted in the commercialization of IC products. As new electronic devices are developed and IC technology advances, new IC products are commercialized. One example IC product that is needed in electronic devices is a direct current (DC) motor controller. In one example DC motor controller, a sensorless field oriented control (FOC) algorithm is used to determine rotor position and to generate motor control signals for a 3-phase DC motor (e.g., a brushless DC electric motor or "BLDC" motor) having a stator (stationary portion of the motor) and a rotor (a rotating portion of the motor). The sensorless FOC algorithm uses measured phase currents rather than contact sensors or Hall-effect sensors, which tend to wear out over time and/or increase design complexity. The motor control signals obtained using a sensorless FOC algorithm are used to control switches of a 3-phase inverter, resulting in different combinations of phase currents depending on the position of the rotor and the target speed. One of the issues that affects the accuracy of sensorless FOC-based motor control is gain and offset mismatch between measured phase currents. Such mismatch causes the sensorless FOC algorithm to determine inaccurate position estimates, and the resulting phase currents for the DC motor (based on the inaccurate position estimates) cause undesirable torque ripple which in turn causes jittering in the mechanical speed of the DC motor. The torque ripple also causes undesirable acoustic noise.

SUMMARY

In accordance with at least one example of the disclosure, a system comprises a motor and a motor controller coupled to the motor. The motor controller comprises a current sense circuit configured to obtain a set of first phase current sense measurements using a first pair of paths and to average the set of first phase current sense measurements and configured to obtain a set of second phase current measurements using a second pair of paths and to average the set of second phase current sense measurements.

In accordance with at least one example of the disclosure, an integrated circuit (IC) comprises a motor controller circuit. The motor controller circuit comprises a processor and a current sense circuit coupled to the processor. The current sense circuit comprises a first phase current sense circuit and a second phase current sense circuit. The current sense circuit also comprises a first multiplexer with inputs coupled to the first and second phase current sense circuits. The current sense circuit also comprises a second multiplexer with inputs coupled to the first and second phase current sense circuits.

In accordance with at least one example of the disclosure, a motor control method comprises obtaining first phase current sense measurements using alternating measurement paths. The motor control method also comprises obtaining second phase current sense measurements using alternating measurement paths. The motor control method also comprises determining control signals for a motor based on the obtained first phase current sense measurements and the obtained second phase current sense measurements.

BRIEF DESCRIPTION OF THE DRAWINGS

For a detailed description of various examples, reference will now be made to the accompanying drawings in which.

DETAILED DESCRIPTION

Disclosed herein is a current sense circuit included with a device (e.g., integrated circuit or "IC") or motor controller, where the current sense circuit includes a path alternation circuit configured to alternate between different current sense measurement paths to obtain current sense measurements. In different examples, the current sense circuit is part of an integrated circuit, multi-die module (MDM), multi-chip module, system on a chip (SoC), or other commercial circuit or device. In some example embodiments, a motor controller uses the current sense measurements to determine motor control signals for a 3-phase direct current (DC) motor. In one example, the motor controller uses a sensorless field oriented control (FOC) algorithm to determine rotor position from the current sense measurements. The motor control signals are then determined based on the rotor position and/or other parameters. In some example embodiments, the motor control signals are provided to the control terminals of at least some of the switches of a 3-phase inverter, resulting in phase currents (e.g., $I_A$, $I_B$, or $I_C$ herein) in two of the windings of a 3-phase DC motor. In the example embodiments, the windings are part of the stator of the motor, and proper phase current combinations cause the rotor of the motor to rotate around the stator.

With the proposed path alternation circuit, the accuracy of current sense measurements used by the motor controller is improved, which results in more accurate rotor position estimates. With more accurate rotor position estimates, the motor control signals determined by the motor controller are improved, resulting in smoother operation of the motor (less torque ripple, jittering, and acoustic noise).

In some example embodiments, a system includes a 3-phase direct current (DC) motor, a pulse generation circuit coupled to the 3-phase DC motor, and a motor controller coupled to the pulse generation circuit. The motor controller includes a current sense circuit with a path alternation circuit, where the path alternation circuit enables the current sense circuit to obtain first phase current sense measurements using alternate paths and to average the first phase current sense measurements. The path alternation circuit also enables the current sense circuit to obtain second phase current measurements using the alternate paths and to average the second phase current sense measurements.

In some example embodiments, the current sense circuit includes a first phase current sense circuit and a second phase current sense circuit. The current sense circuit also includes a path alternation circuit corresponding to a first multiplexer and a second multiplexer with inputs coupled to the first and second phase current sense circuits. The motor controller uses the first and second phase current measurements obtained by the current sense circuit to determine motor control signals. In one example embodiment, the motor control signals are provided to a pulse generation circuit that includes a pulse-width modulation (PWM) circuit, a driver circuit, and a 3-phase inverter. Specifically, the PWM circuit outputs PWM signals based on the motor control signals. The PWM signals are provided to the driver circuit to generate drive signals to control switches of the 3-phase inverter. The 3-phase inverter outputs phase current to the motor (e.g., a 3-phase DC motor). During motor operations, new current sense measurements are obtained using the current sense circuit, and motor control operations are repeated based on the new current sense measurements. To provide a better understanding, various current sense circuit options and related systems or scenarios are described using the figures as follows.

Figure 1:
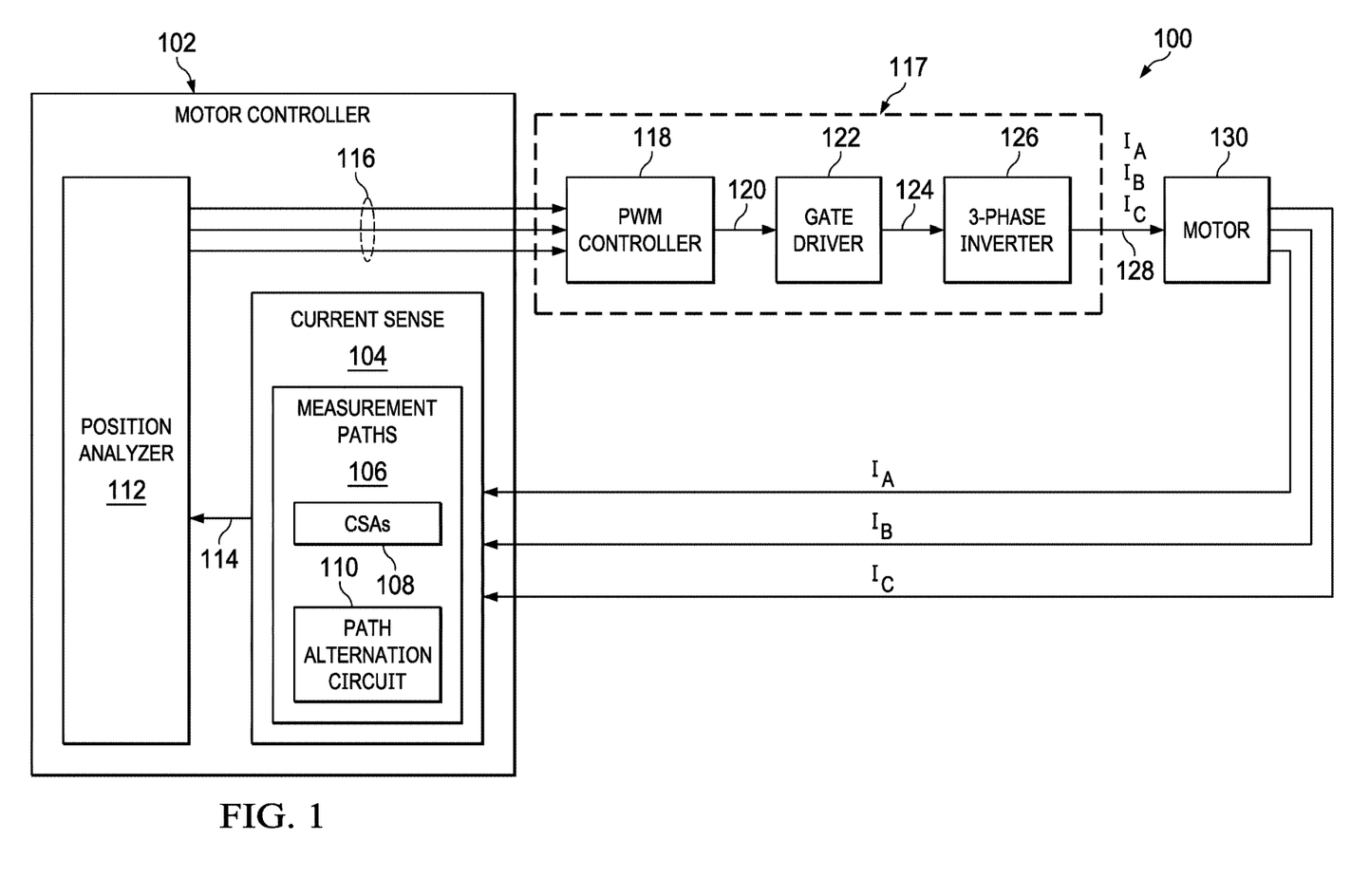
FIG. 1 is a block diagram showing a system in accordance with an example embodiment.

FIG. 1 is a block diagram showing a system 100 in accordance with an example embodiment. As shown, the system 100 comprises a motor controller 102 coupled to a pulse generation circuit 117, where the pulse generation circuit 117 is coupled to a motor 130 and provides multiphase signals 128 to the motor 130. In the example of FIG. 1, the pulse generation circuit 117 includes a PWM controller 118 coupled to the motor controller 102 and configured to generate PWM signals 120. The PWM signals 122 are received by a gate driver 122, which provides drive signals 124 to switches (not shown) of a 3-phase inverter 126, resulting in phase currents 128 to turn the motor 130. In some example embodiments, the 3-phase inverter 126 is a conventional 3-phase inverter with three high-side switches (each coupled to a supply voltage) and three low-side switches (each coupled to ground), where each of three phase currents for the motor 130 is selectively generated by the operations of a respective high-side switch and low-side switch as controlled by the drive signals 124.

As shown, the motor 130 is also coupled to the motor controller 102 as part of a feedback or control loop that includes components of the motor controller 102. More specifically, the motor controller 102 receives whichever phase currents (e.g., two of $I_A$, $I_B$, or $I_C$) are injected into respective coils of the motor 130. To measure the phase currents, the motor controller 102 includes a current sense circuit 104 configured to obtain first phase current sense measurements of a first phase current ($I_A$) and second phase current sense measurements of a first phase current ($I_B$). In the example of FIG. 1, the current sense circuit 104 is represented as having measurement paths 106 with current sense amplifiers (CSA) 108 (e.g., one CSA for each of the measurement paths 106 is preferable) and with a path alternation circuit 110. In some example embodiments, the path alternation circuit 110 includes two multiplexers (see e.g., the current sense circuit 300 of FIG. 3) to provide current sense measurements for a first phase current (e.g., one of $I_A$, $I_B$, and $I_C$) and a second phase current (e.g., another of $I_A$, $I_B$, and $I_C$) using alternate paths.

In the example of FIG. 1, the first and second phase current sense measurements 114 (e.g., current sense values for each phase obtained using alternate paths, where the values for each phase are averaged and digitized) are provided to a position analyzer 112, which determines a rotor position based on the first and second phase current sense measurements 114 using conventional techniques (e.g., a sensorless FOC algorithm). The position analyzer 112 is configured to output control signals 116 to the pulse generation circuit 117 based on the first and second phase current sense measurements 114 and/or the determined rotor position. In some example embodiments, the position analyzer 112 uses a conventional sensorless FOC algorithm to determine rotor position based on the first and second phase current sense measurements 114.

Figure 2A:
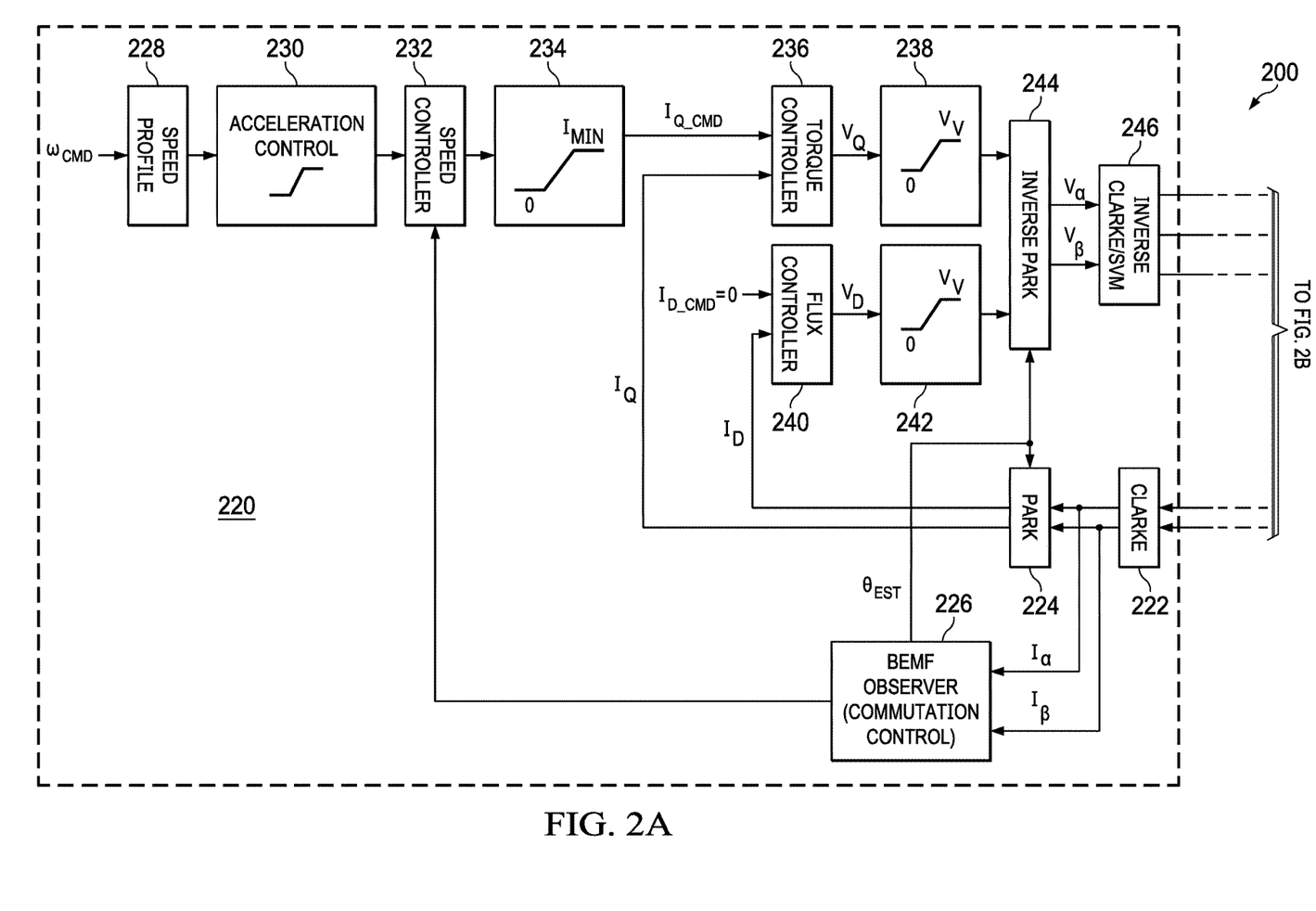
FIGS. 2A and 2B is a block diagram showing a system with field oriented control (FOC) motor control in accordance with an example embodiment.
Figure 2B:
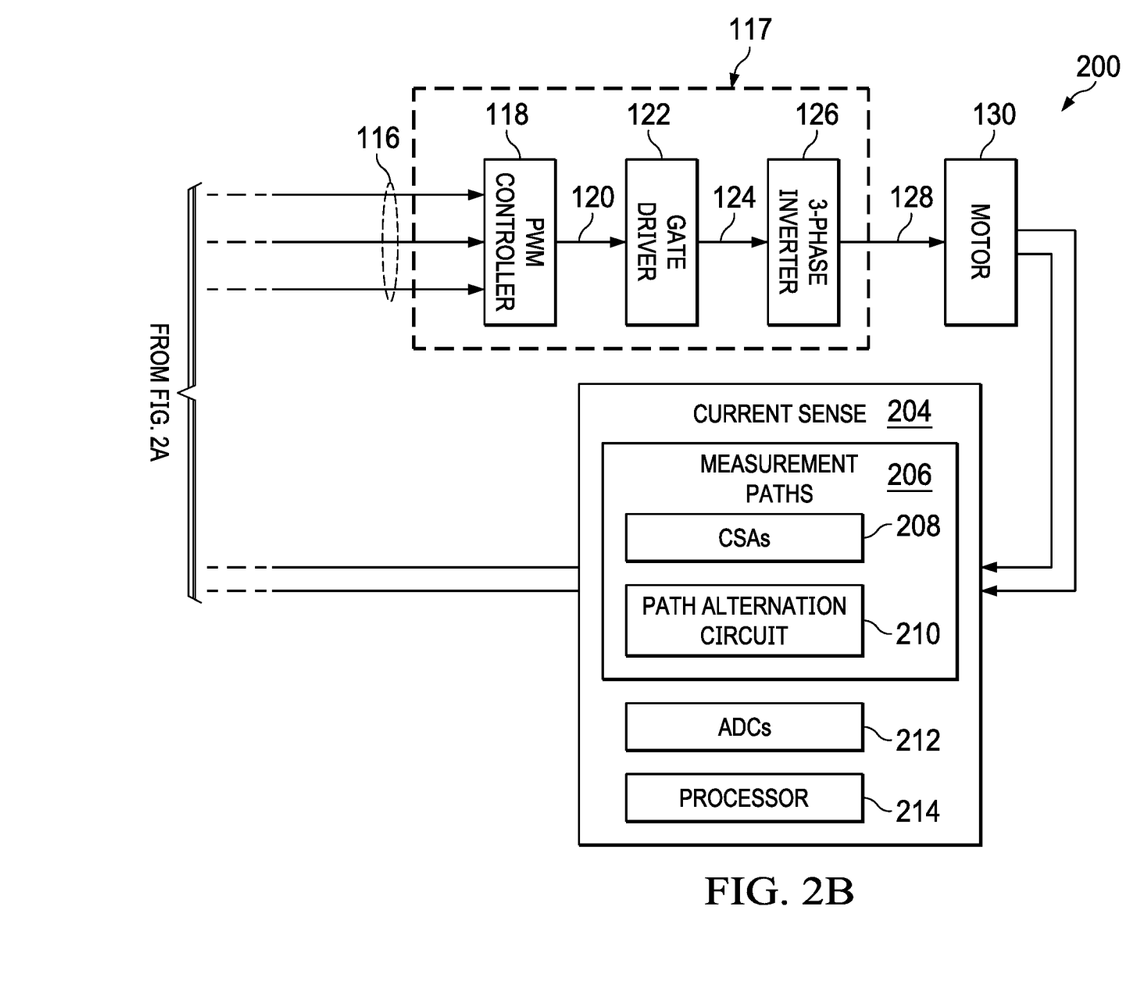

FIGS. 2A and 2B is a block diagram showing a system 200 with FOC motor control in accordance with an example embodiment. As shown, the system 200 comprises a processor 220 configured to perform various conventional sensorless FOC operations represented by blocks 222, 224, 226, 228, 230, 232, 234, 236, 238, 240, 242, 244, and 246. More specifically, block 222 corresponds to Clarke operations based on obtained first and second phase current sense measurements from a current sense circuit 204 (an example of the current sense circuit 104 in FIG. 1), where the accuracy of the first and second phase current sense measurements are improved by use of the path alternation circuit 110. Block 224 corresponds to Park operations based on the outputs ($I_\alpha$ and $I_\beta$) from block 222 and a theta estimate ($\theta_{EST}$) from block 226. Block 226 corresponds to back electromagnetic force (BEMF) observer operations based on the outputs from block 222. Block 228 corresponds to speed profile operations involving $\omega_{CMD}$, where $\omega_{CMD}$ is a user defined speed command. Block 230 corresponds to acceleration control operations based on the output of block 228. Block 232 corresponds to speed controller operations based on the outputs of blocks 226 and 230. Block 234 corresponds to current control operations based on the output of block 232, where the output of block 234 is a command current ($I_{Q\_CMD}$). Block 236 corresponds to torque controller operations based on $I_{Q\_CMD}$ from block 234 and $I_Q$ from block 224. Block 238 corresponds to voltage ramp operations based on the output ($V_Q$) of block 236. Block 240 corresponds to flux controller operations based on a first current ($I_{D\_CMD}$) and a second current ($I_D$) from block 224. Block 242 corresponds to voltage ramp operations based on the output ($V_D$) of block 240. Block 244 corresponds to inverse Park operations based on the outputs from block 238 and 242. Block 246 corresponds to inverse Clarke and space vector modulation (SVM) operations based on the outputs ($V_\alpha$ and $V_\beta$) from block 244.

In some example embodiments, the outputs of block 246 corresponds to the control signals 116 (e.g., $V_A$, $V_B$, $V_C$) for a pulse generation circuit 117 coupled to a motor. Again, the pulse generation circuit 117 includes a PWM controller 118, a gate driver 122, and a 3-phase inverter 12. As part of the control loop for the system 200, current sense measurements from the motor 130 are obtained using the current sense circuit 204. In the example of FIG. 2, the current sense circuit 204 is represented as having measurement paths 206 with CSAs 208 (e.g., one CSA for each of the measurement paths 206) and with a path alternation circuit 210. In some example embodiments, the path alternation circuit 210 includes two multiplexers (see e.g., the current sense circuit 300 of FIG. 3) to provide alternating current sense measurements for a first phase current (e.g., $I_A$) and a second phase current (e.g., $I_B$). In some example embodiments, the current sense circuit 204 also includes analog-to-digital converters (ADCs) 212 (e.g., to digitize first phase and second phase current sense measurements along each of the alternate paths corresponding to each of the measurement paths 206). The current sense circuit 204 also includes a processor 214. In some example embodiments, the processor 214 receives the outputs of the ADCs 212, where the obtained first phase and second phase current sense measurements provided by the current sense circuit 204 are based on the processor 214 averaging a set of digital first phase current sense measurements obtained using measurement paths 206 and the path alternation circuit 210. The processor 214 also averages a set of digital second phase current sense measurements obtained using measurement paths 206 and the path alternation circuit 210. In some example embodiments, the processor 214 is separate from the processor 220. In other examples, processor 214 and processor 220 are implemented in a single processor.

In some example embodiments, a system (e.g., the system 100 of FIG. 1, or the system 200 of FIGS. 2A and 2B) includes a motor (e.g., the motor 130 in FIGS. 1 and 2B) and a pulse generation circuit (e.g., the pulse generation circuit 117) coupled to the motor. In one example embodiment, motor 130 is a permanent magnet synchronous motor ("PMSM"). In other embodiments, motor 130 is a brushless DC motor ("BLDC"). The system also includes a motor controller (e.g., the motor controller 102 in FIG. 1) coupled to the pulse generation circuit, where the motor controller includes a current sense circuit (e.g., the current sense circuit 104 in FIG. 1, or the current sense circuit 204 in FIG. 2) configured to: obtain a set of first phase current sense measurements using a first pair of paths and to average the set of first phase current sense measurements; and obtain a set of second phase current measurements using a second pair of paths and to average the set of second phase current sense measurements. In some example embodiments, the motor controller comprises a processor configured to determine control signals (e.g., control signals 116 in FIGS. 1 and 2B) for the motor based on a FOC algorithm that uses an averaged set of first phase current sense measurements values and an averaged set of second phase current sense measurements values.

Figure 3:
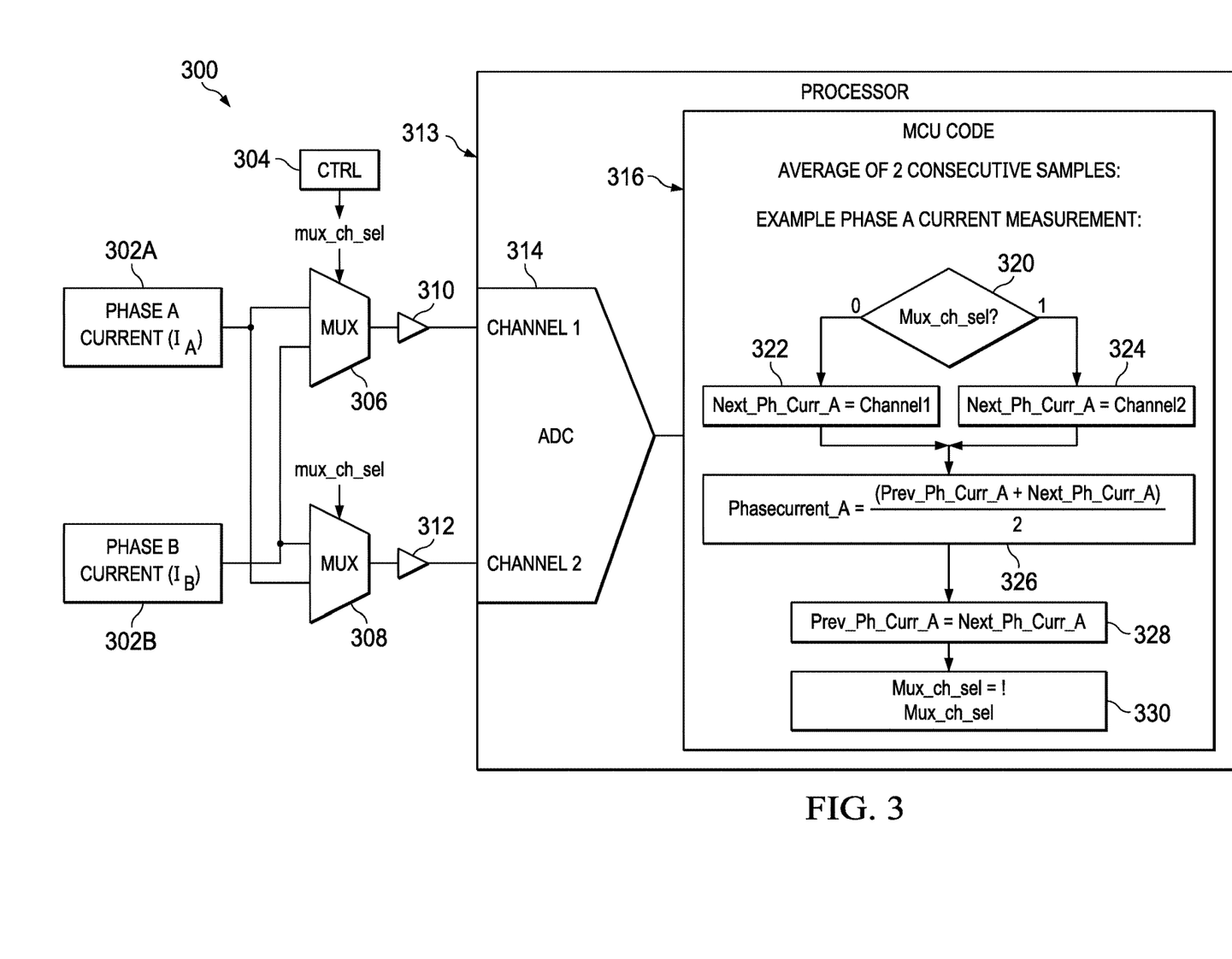
FIG. 3 is a diagram showing a current sense circuit for a motor controller in accordance with an example embodiment.

FIG. 3 is a diagram showing a current sense circuit 300 (an example of the current sense circuit 104 in FIG. 1, or the current sense circuit 204 in FIG. 2) for a motor controller (e.g., the motor controller 102 in FIG. 1) in accordance with some examples. As shown, the current sense circuit 300 includes a first phase (e.g., phase A) current sense circuit 302A and a second phase (e.g., phase B) current sense circuit 302B. Though not shown in FIG. 3, it should be understood that the current sense circuit 300 may also include a third phase (e.g., phase C) current sense circuit, where usually two of the three available phase currents are injected into a motor during initial position detection (IPD) operations and/or ongoing motor control operations. In the example of FIG. 3, the first phase current sense circuit 302A outputs a first voltage differential (e.g., the voltage across a first sense resistor) to represent the first phase current. The second phase current sense circuit 302B outputs a second voltage differential (e.g., the voltage across a second sense resistor) to represent the second phase current.

The current sense circuit 300 also includes a first multiplexer 306 coupled to the first and second phase current sense circuits 302A and 302B. As shown, the first phase current sense circuit 302A is coupled to a first input of the first multiplexer 306, and the second phase current sense circuit 302B is coupled to a second input of the first multiplexer 306. The current sense circuit 300 also includes a second multiplexer 308 coupled the first and second phase current sense circuits 302A and 302B. As shown, the second phase current sense circuit 302A is coupled to a second input of the second multiplexer 308, and the second phase current sense circuit 302B is coupled to a first input of the first multiplexer 306. In some example embodiments, the use of first multiplexer 306 in conjunction with second multiplexer 308 allows for alternating measurements for each phase current. By averaging the measurements obtained for each phase current using alternating paths, the gain error and offset of each measurement path is equalized, which improves the accuracy of the phase current measurements. These more accurate phase current measurements improve the accuracy of subsequent motor control operations (e.g., rotor position estimation and subsequent motor control signals), which reduces torque ripple, jittering, and acoustic noise.

The current sense circuit 300 also includes a controller 304 coupled to the first and second multiplexers 306 and 308, and configured to provide a control signal (mux_ch_sel). When mux_ch_sel is 0 (for example), the first multiplexer 306 outputs the output from the first phase current sense circuit 302A, and the second multiplexer 306 outputs the output from the second phase current sense circuit 302B. When mux_ch_sel is 1 (in this example), the first multiplexer 306 outputs the output from the second phase current sense circuit 302A, and the second multiplexer 306 outputs the output from the first phase current sense circuit 302B. In some example embodiments, the controller 304 alternates mux_ch_sel between 0 and 1 such that the first and second multiplexers 306 and 308 alternate the measurement paths conveying the output of the first phase current sense circuit 302A and the output of the second phase current sense circuit 302B.

In the example of FIG. 3, each measurement path includes a current sense amplifier (CSA), which applies a gain and offset to the sensed signal. Without using an example embodiment, the difference in the gains and offsets applied by different CSAs to different phase currents adds inaccuracy to the end results. Using an example embodiment (use of alternating paths for each phase current and subsequent averaging of results for each phase current), each phase current is affected equally by the gain error and offset of different CSAs, which improves the overall accuracy of multi-phase calculations such as rotor position estimation.

In some example embodiments, a first measurement path at the output of the first multiplexer 306 includes a first CSA 310 and an ADC 314 with a first channel (channel 1) coupled to an output of the first CSA 310. Also, a second measurement path at the output of the second multiplexer 308 includes a second CSA 312 and the ADC 314 with a second channel (channel 2) coupled to an output of the second CSA 312. In other examples, separate ADCs are used rather than the multi-channel ADC 314.

In the example of FIG. 3, the ADC 314 is part of a processor 313. In the example of FIG. 3, to process the digital values output from the ADC 314, the processor 313 executes code 316 represented by blocks 320, 322, 324, 326, 328, and 330 to perform averaging of first phase current sense measurements received via alternating measurement paths (averaging of second phase current sense measurements or third phase current sense measurements received via alternating measurement paths is not represented, but is similarly performed as needed by the processor 313). In some example embodiments, the code 316 identifies if mux_ch_sel is 0 or 1 at decision block 320. If the mux_ch_sel is 0, the next digital sample of the first phase current sense measurement is provided by channel1 of the ADC 314 at block 322. If the mux_ch_sel is 1, the next digital sample of the first phase current sense measurement is provided by channel2 of the ADC 314 at block 324. At block 326, the next digital sample of the first phase current sense measurement and the previous digital sample of the first phase current sense measurement (from alternating measurement paths) are averaged. At block 328, the next digital sample of the first phase current sense measurement is set as the previous digital sample of the first phase current sense measurement. At block 330, mux_ch_sel is updated to alternate the control signal value (from 0 to 1, or 1 to 0). The averaging of first phase current sense measurements is repeated as desired, where the averaged first phase current sense measurements are used for rotor position estimation operations and/or other motor control operations as described herein. As previously noted, in some example embodiments, similar operations are used to average second phase current sense measurements or third phase current sense measurements, where the averaged first, second, or third phase current sense measurements are used for rotor position estimation operations and/or other motor control operations as described herein. Also, in some example embodiments, similar operations are used to average third phase (e.g., phase C) current sense measurements, where the averaged third phase current sense measurements are used for rotor position estimation operations and/or other motor control operations as described herein. In some example embodiments, the processor 313 also performs other operations related to rotor position estimation and/or otherwise generating motor control signals as described herein. In other examples, the processor 313 provides the averaged current sense measurements to another processor to perform rotor position estimation and/or to otherwise generate motor control signals as described herein.

In some example embodiments, a system (e.g., the system 100 of FIG. 1, or the system 200 of FIG. 2) includes a current sense circuit (e.g., the current sense circuit 104 of FIG. 1, the current sense circuit 204 of FIG. 2, or the current sense circuit 300 of FIG. 3) with a first multiplexer (e.g., the first multiplexer 306 in FIG. 3) with inputs coupled to the first pair of paths. The current sense circuit also includes a second multiplexer (e.g., the second multiplexer 308 in FIG. 3) with inputs coupled to the second pair of paths. The current sense circuit also includes a first CSA (e.g., one of the CSAs 108 in FIG. 1, one of the CSAs 208 in FIG. 3, the first CSA 310 in FIG. 3) coupled to an output of the first multiplexer. The current sense circuit also includes a second CSA (e.g., one of the CSAs 108 in FIG. 1, one of the CSAs 208 in FIG. 3, the second CSA 312 in FIG. 3) coupled to an output of the second multiplexer.

In some example embodiments, the current sense circuit includes a first ADC channel (e.g., one of the ADCs 212, or a first channel of the ADC 314) coupled to an output of the first current sense amplifier. The current sense circuit includes a second ADC channel (e.g., one of the ADCs 212, or a second channel of the ADC 314) coupled to an output of the second current sense amplifier. In some example embodiments, the current sense circuit includes a processor (e.g., the processor 214 in FIG. 2, the processor 220 in FIG. 2, or the processor 313 in FIG. 3) coupled to an output of first ADC channel and to an output of the second ADC channel, wherein the processor is configured to determine a rotor position based on a digitized version of the first phase sense current values and digitized version of the set of second phase sense current values output from the first ADC channel and the second ADC channel. In some example embodiments, the processor is configured to average digitized and consecutive first phase current sense measurement values and to average digitized and consecutive second phase current sense measurement values. Also, in some example embodiments, the current sense circuit (e.g., the current sense circuit 104 in FIG. 1, the current sense circuit 204 in FIG. 2, or the current sense circuit 300 in FIG. 3) includes a first phase current measurement circuit (e.g., the first phase current measurement circuit 302A in FIG. 3) coupled to a first path of the first pair of paths and to a second path of the second pair of paths, wherein the first phase current measurement circuit is configured to provide a first phase current measurement voltage. The current sense circuit also includes a second phase current measurement circuit (e.g., the first phase current measurement circuit 302B in FIG. 3) coupled to a second path of the first pair of paths and to a first path of the second pair of paths, wherein the second phase current measurement circuit is configured to provide a second phase current measurement voltage.

In some example embodiments, the current sense circuit further comprises a controller (e.g., the controller 304 in FIG. 3) coupled to the first multiplexer and the second multiplexer, where the controller is configured to control the first multiplexer to alternate between passing the first phase current sense measurement voltage and the second phase current sense measurement voltage, and where the controller is configured to control the second multiplexer to alternate between passing the second phase current sense voltage and the first phase current sense voltage. In combination with alternating the paths used to pass the first and second phase current sense measurement voltage, in some example embodiments, a processor is configured to average consecutive samples of the first phase current sense voltage. Also, the processor is configured to average consecutive samples of the second phase current sense voltage. In other example embodiments, a single processing unit may be utilized instead of separate processors. Alternatively, block 316 may be implemented in hardware.

Figure 4:
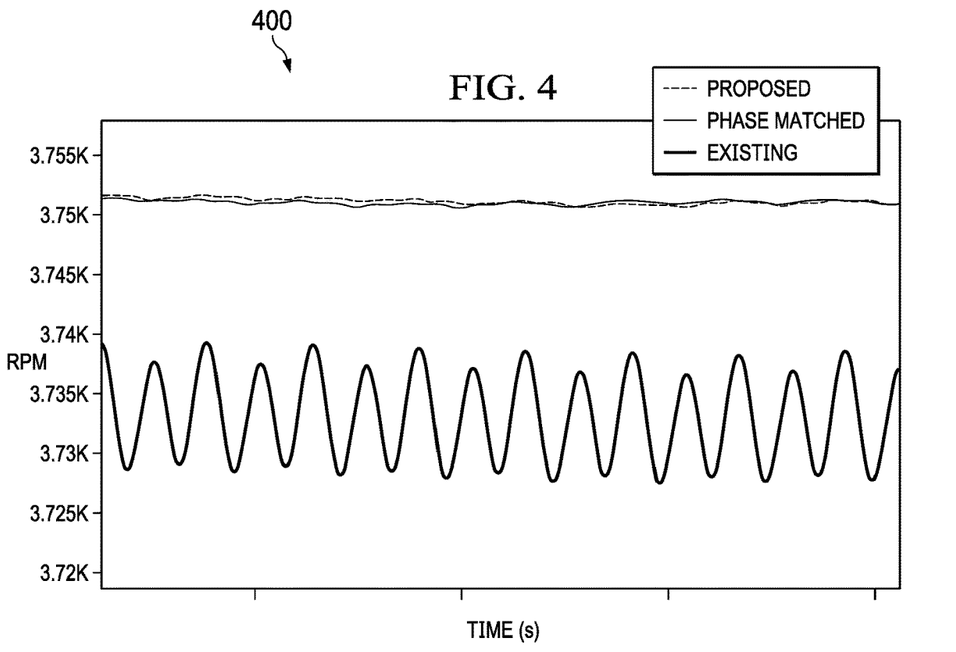
FIG. 4 is a graph showing motor speed ripple due to measurement path gain error with and without the proposed alternating current sense measurement paths.

FIG. 4 is a graph 400 showing motor speed ripple due to measurement path gain error with and without the proposed alternation of current sense measurement paths and subsequent averaging as described herein for some example embodiments. In the graph 400, the vertical axis of graph 400 shows motor speed in rotations per minute (RPM) and the horizontal axis shows elapsed time (in seconds). The existing (bolded line) waveform of graph 400 represents motor speed ripple due to measurement path gain error without alternating the current sense measurement paths as described herein. The phase matched (solid thin line) waveform of graph 400 represents motor speed ripple due to measurement path gain error where phase matching is used to reduce the motor speed ripple. As used herein, "phase matched" refers to an idealized scenario, where the gain error for each phase current is matched (e.g., the CSAs are perfectly matched). The dashed line of graph 400 represents motor speed ripple due to measurement path gain error where alternating the measurement paths and averaging the obtained measurements for each phase current as in some example embodiments is used to cancel the gain error and thus reduce the motor speed ripple.

Figure 5:
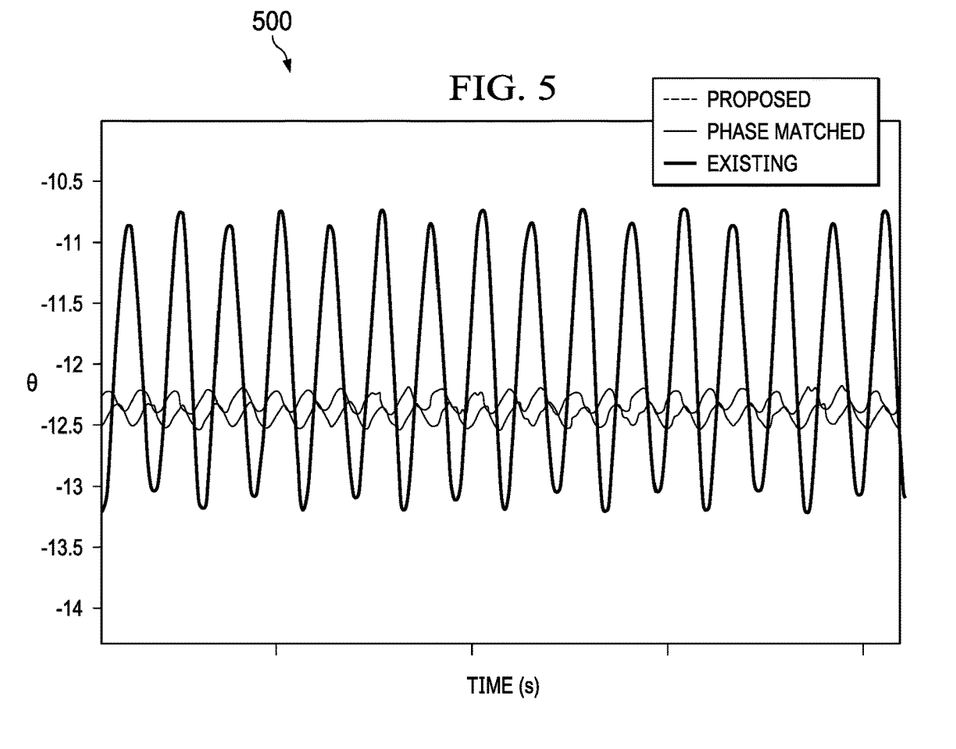
FIG. 5 is a graph showing theta error due to measurement path gain error with and without the proposed alternating current sense measurement paths.

FIG. 5 is a graph 500 showing theta error in degrees (rotor position error) due to measurement path gain error with and without the proposed alternation of current sense measurement paths and subsequent averaging as described herein for some example embodiments. The existing (bolded line) waveform of graph 500 represents theta error due to measurement path gain error using conventional technology. The phase matched (solid thin line) waveform of graph 500 represents theta error due to measurement path gain error where phase matching is used to reduce the theta error. The dashed line of graph 500 represents theta error due to measurement path gain error where alternating measurement paths and averaging of some example embodiments is used to reduce the theta error.

Figure 6:
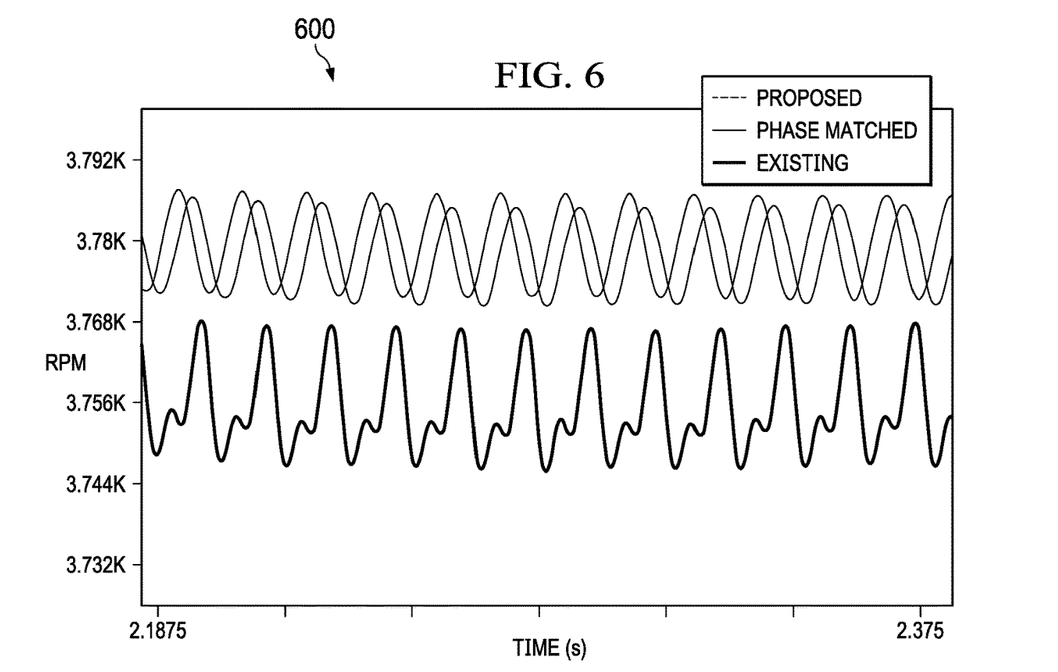
FIG. 6 is a graph showing motor speed ripple due to measurement path gain error and offset with and without the proposed alternating current sense measurement paths.

FIG. 6 is a graph 600 showing motor speed ripple due to measurement path gain error and offset with and without the proposed alternation of current sense measurement paths and subsequent averaging as described herein for some example embodiments. The existing (bolded line) waveform of graph 600 represents motor speed ripple due to measurement path gain error and offset using conventional technology. The phase matched (solid thin line) waveform of graph 600 represents motor speed ripple due to measurement path gain error and offset where phase matching is used to reduce the motor speed ripple. The dashed line of graph 600 represents motor speed ripple due to measurement path gain error and offset where alternating the measurement paths and averaging as in some example embodiments is used to reduce the motor speed ripple. Comparing graph 400 of FIG. 4 and graph 600 of FIG. 6, it can be seen that alternating the current sense measurement paths as described herein reduces motor speed ripple due to gain error, but does not reduce motor speed ripple due to offset.

Figure 7:
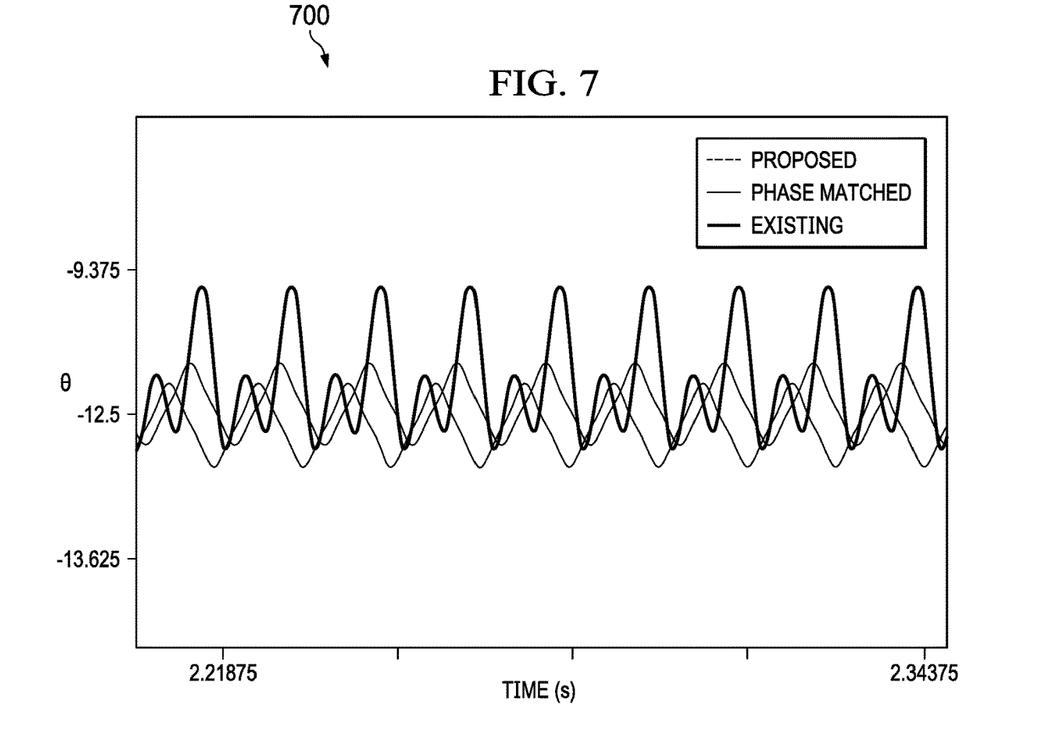
FIG. 7 is a graph showing theta error due to measurement path gain error and offset with and without the proposed alternating current sense measurement paths.

FIG. 7 is a graph 700 showing theta error due to measurement path gain error and offset with and without the proposed alternation of current sense measurement paths and subsequent averaging as described herein for at least some example embodiments. The existing (bolded line) waveform of graph 700 represents theta error due to measurement path gain error and offset using conventional technology. The phase matched (normal line) waveform of graph 700 represents theta error due to measurement path gain error and offset where phase matching is used to reduce the theta error. The dashed line of graph 700 represents theta error due to measurement path gain error and offset where alternating measurement paths and averaging as in some example embodiments is used to reduce the theta error. Comparing graph 500 of FIG. 5 and graph 700 of FIG. 7, it can be seen that alternating the current sense measurement paths as in some example embodiments reduces theta error due to gain error, but does not reduce theta error due to offset.

Figure 8:
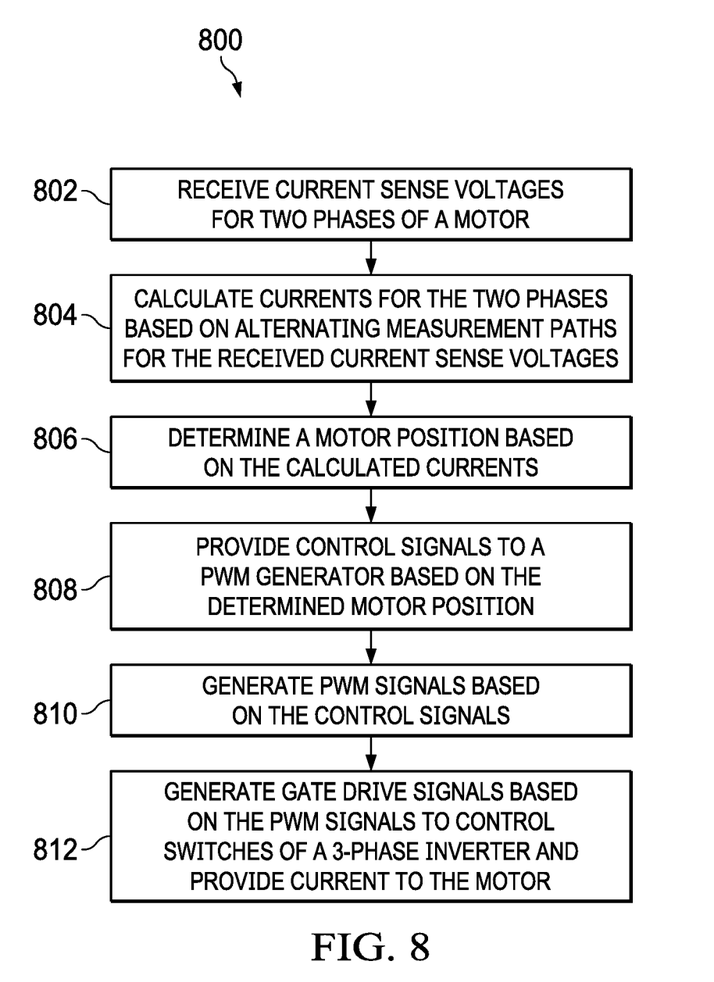
FIG. 8 is a flow chart showing a motor control method in accordance with an example embodiment.

FIG. 8 is a flow chart showing a motor control method 800 in accordance with some examples. As shown, the motor control method 800 includes receiving current sense voltages for two phases of a motor (e.g., from the first and second phase current sense circuits 302A and 302B in FIG. 3) at block 802. At block 804, currents are calculated for the two phases based on alternating measurement paths for the received current sense voltages. In other words, block 804 involves obtaining first phase current sense measurements using alternating measurement paths, and obtaining second phase current sense measurements using alternating measurement paths.

In some example embodiments, the operations of block 804 involve adjusting control signals for a first multiplexer and a second multiplexer to obtain the first phase current sense measurements using alternating measurement paths, and to obtain the second phase current sense measurements using alternating measurement paths. In some example embodiments, the operations of block 804 involve amplifying outputs of the first and second multiplexers to obtain the first phase current sense measurements using alternating measurement paths, and to obtain the second phase current sense measurements using alternating measurement paths. In some example embodiments, the operations of block 804 involve digitizing outputs of the first and second multiplexers. In some example embodiments, the operations of block 804 include averaging a set of digital and consecutive first phase current sense measurements obtained using different measurement paths (e.g., measurement paths 206) and a path alternation circuit (e.g., the path alternation circuit 210 in FIG. 2, or the first and second multiplexers 306 and 308 in FIG. 3). Also, in some example embodiments, the operations of block 804 involve averaging a set of digital and consecutive second phase current sense measurements obtained using different measurement paths (e.g., measurement paths 206) and a path alternation circuit (e.g., the path alternation circuit 210 in FIG. 2, or the first and second multiplexers 306 and 308 in FIG. 3).

At block 806, a rotor position is determined based on the currents calculated at block 804. At block 808, control signals are provided to a PWM generator based on the determined rotor position. In some example embodiments, an FOC algorithm is used to determine rotor position based on the calculated currents. In other words, in some example embodiments, block 808 involves determining control signals for a motor based on the obtained first phase current sense measurements and the obtained first phase current sense measurements. At block 810, PWM signals are generated based on the control signals (such as control signals 116) provided at block 808. At block 812, gate drive signals are generated based on the PWM signals to control switches of a 3-phase inverter and provide current to the motor.

In some example embodiments, the control signals (e.g., the control signals 116) determined at block 808 are the components of the stator vector voltage in the ($\alpha$, $\beta$) stationary orthogonal reference frame. These control signals are the inputs to a PWM generator (e.g., a space-vector PWM generator). The PWM signals generated at block 810 are used to control both the frequency and magnitude of the voltage and current applied to a motor. As a result, PWM inverter-powered motor drivers offer better efficiency and higher performance compared to fixed frequency motor drivers. The energy that a PWM inverter (e.g., the 3-phase inverter 126) delivers to a motor is controlled by the PWM signals (e.g., the PWM signals 120) generated at block 810, which determine the timing of drive signals (e.g., the drive signals 124) to the gates of the power transistors of the PWM inverter. In different example embodiments, different PWM techniques (ways of determining the modulating signal and the switch-on/switch-off instants from the modulating signal) are possible. Available options includes sinusoidal PWM, hysteric PWM and the relatively new space-vector (SV) PWM.

A typical three-phase inverter controls six power transistors (Q1-Q6) to provide three output voltages (Va, Vb and Vc) based on drive signal a, a', b, b', c and c'. Specifically, a is the drive signal for high-side switch Q1, a' is the drive signal for low-side switch Q2, b is the drive signal for high-side switch Q3, b' is the drive signal for low-side switch Q4, c is the drive signal for high-side switch Q5, c' is the drive signal for low-side switch Q6. When an high-side transistor is switched on (i.e., when a, b or c is 1), the corresponding low-side transistor is switched off (i.e., the corresponding a', b' or c' is 0). The on and off states of the upper transistors, Q1, Q3 and Q5, or equivalently, the state of a, b and c, are sufficient to evaluate the output voltage for the purpose of this discussion.

With space-vector PWM, the relationship between the switching variable vector [a, b, c]$^t$, the line-to-line output voltage vector [Vab Vbc Vca]$^t$, and the phase (line-to-neutral) output voltage vector [Va Vb Vc]$^t$ is given by equations 1 and 2 below.

$$\begin{bmatrix} V_{ab} \\ V_{bc} \\ V_{ca} \end{bmatrix} = V_{dc} \begin{bmatrix} 1 & -1 & 0 \\ 0 & 1 & -1 \\ -1 & 0 & 1 \end{bmatrix} \begin{bmatrix} a \\ b \\ c \end{bmatrix}, \quad \text{Equation (1)}$$

$$\begin{bmatrix} V_a \\ V_b \\ V_c \end{bmatrix} = \frac{1}{3} V_{dc} \begin{bmatrix} 1 & -1 & 0 \\ 0 & 1 & -1 \\ -1 & 0 & 1 \end{bmatrix} \begin{bmatrix} a \\ b \\ c \end{bmatrix}, \quad \text{Equation (2)}$$

where $V_{dc}$ is the DC supply voltage, or bus voltage. There are eight possible combinations of on and off states for the three high-side power transistors. In equations 1 and 2, the eight combination and the derived output line-to-line and phase voltages are expressed in terms of Vdc. Table 1 shows device on/off states and corresponding outputs (relative to $V_{dc}$) of a 3-phase inverter.

| a | b | c | $V_a$ | $V_b$ | $V_c$ | $V_{ab}$ | $V_{bc}$ | $V_{ca}$ |
|---|---|---|---|---|---|---|---|---|
| 0 | 0 | 0 | 0 | 0 | 0 | 0 | 0 | 0 |
| 1 | 0 | 0 | ⅔ | -⅓ | -⅓ | 1 | 0 | -1 |
| 1 | 1 | 0 | ⅓ | ⅓ | -⅔ | 0 | 1 | -1 |
| 0 | 1 | 0 | -⅓ | ⅔ | -⅓ | -1 | 1 | 0 |
| 0 | 1 | 1 | -⅔ | ⅓ | ⅓ | -1 | 0 | 1 |
| 0 | 0 | 1 | -⅓ | -⅓ | ⅔ | 0 | -1 | 1 |
| 1 | 0 | 1 | ⅓ | -⅔ | ⅓ | 1 | -1 | 0 |
| 1 | 1 | 1 | 0 | 0 | 0 | 0 | 0 | 0 |

In the proposed example embodiments, use of a path alternation circuit and averaging of measurements as described herein improves the overall accuracy of the phase measurements by reducing the effect of measurement path gain error. These more accurate phase measurements are used by a motor controller to estimate rotor position and provide control signals (e.g., the control signals 116) for a PWM generator based on the estimated rotor position. The control signals determine the timing of the drive signals a, a', b, b', c and c' for the power transistors of a 3-phase inverter, resulting in phase voltages ($V_a$, $V_b$, $V_c$) being applied to the motor and related phase currents ($I_A$, $I_B$, $I_C$) through the motor.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. A system, comprising:
   a motor controller adapted to be coupled to a motor, wherein the motor controller includes a current sense circuit configured to:
   receive a first phase current sense measurement on a first measurement path;
   receive the first phase current sense measurement on a second measurement path;
   receive a second phase current measurement on the first measurement path;
   receive the second phase current on the second measurement path;
   average the first phase current sense measurement on the first measurement path with the first phase current sense measurement on the second path; and
   average the second phase current sense measurement on the first measurement path with the second phase current sense measurement on the second path.

2. The system of claim 1, wherein the current sense circuit comprises:
   a first multiplexer with a first input and a second input;
   a second multiplexer with a first input coupled to the second input of the first multiplexer and a second input coupled to the first input of the first multiplexer; and
   wherein the first measurement path is through the first multiplexer and the second measurement path is through the second multiplexer.

3. The system of claim 2, wherein the current sense circuit comprises:
   a first current sense amplifier coupled to an output of the first multiplexer; and
   a second current sense amplifier coupled to an output of the second multiplexer.

4. The system of claim 2, wherein the current sense circuit further comprises a controller coupled to the first multiplexer and the second multiplexer, and wherein the controller is configured to control the first multiplexer to alternate between passing the first phase current sense measurement and the second phase current sense measurement, and wherein the controller is configured to control the second multiplexer to alternate between passing the second phase current sense measurement and the first phase current sense measurement.

5. The system of claim 3, further comprising:
   a first analog-to-digital converter (ADC) channel coupled to an output of the first current sense amplifier, wherein the first ADC channel is configured to output digital samples of the first and second phase current sense measurements from the first measurement path; and
   a second ADC channel coupled to an output of the second current sense amplifier, wherein the second ADC channel is configured to output digital samples of the first and second phase current sense measurements from the second measurement path.

6. The system of claim 5, further comprising a processor coupled to an output of the first ADC channel and to an output of the second ADC channel, wherein the processor is configured to determine a rotor position based on the digital samples of the first phase current sense measurements from the first and second measurement paths and based on the digital samples of the second phase current sense measurements from the first and second measurement paths.

7. The system of claim 5, wherein the motor controller comprises a processor configured to determine control signals for the motor based on a sensorless field oriented control (FOC) algorithm that uses an averaged set of consecutive digital samples of the first phase current sense measurement and an averaged set of consecutive second phase current sense measurements values.

8. The system of claim 6, wherein the processor is configured to average consecutive digital samples of the first phase current sense measurement and to average consecutive digital samples of the second phase current sense measurement.

9. The system of claim 1, wherein the motor and the motor controller are components of a fan.

10. An integrated circuit (IC), comprising:
a current sense circuit coupled to a processor, wherein the current sense circuit comprises:
a first phase current sense circuit;
a second phase current sense circuit;
a first multiplexer with inputs coupled to the first and second phase current sense circuits;
a second multiplexer with inputs coupled to the first and second phase current sense circuits;
a first current sense amplifier coupled to an output of the first multiplexer; and
a second current sense amplifier coupled to an output of the second multiplexer.

11. The IC of claim 10, further comprising:
a first analog-to-digital converter (ADC) channel coupled to an output of the first current sense amplifier; and
a second ADC channel coupled to an output of the second current sense amplifier.

12. The IC of claim 11, further comprising a processor coupled to an output of the first ADC channel and to an output of the second ADC channel, wherein the processor is configured to average a set of digital and consecutive first phase current sense measurement values and to average a set of digital and consecutive second phase current sense measurement values provided by the first and second ADC channels.

13. The IC of claim 12, wherein the processor is further configured to determine a rotor position based on the averaged digital first phase current sense measurement values and the averaged digital second phase current sense measurement values.

14. The IC of claim 10, wherein the current sense circuit further comprises a controller coupled to the first multiplexer and the second multiplexer, and wherein the controller is configured to control the first multiplexer to alternate between passing a first phase current sense measurement voltage from the first phase current sense circuit and a second phase current sense measurement voltage from the second phase current sense circuit the second phase current sense measurement voltage, and wherein the controller is configured to control the second multiplexer to alternate between passing the second phase current sense voltage and the first phase current sense voltage.

15. A motor control method, comprising:
obtaining first phase current sense measurements using alternating measurement paths by averaging a set of digital and consecutive first phase current sense measurements obtained using the alternating measurement paths;
obtaining second phase current sense measurements using alternating measurement paths by averaging a set of digital and consecutive second phase current sense measurements obtained using the alternating measurement paths; and
determining control signals for a motor based on the obtained first phase current sense measurements and the obtained second phase current sense measurements.

16. The motor control method of claim 15, wherein obtaining the first phase current sense measurements using alternating measurement paths and obtaining the second phase current sense measurements using alternating measurement paths comprises adjusting control signals for a first multiplexer and a second multiplexer.

17. The motor control method of claim 16, wherein obtaining the first phase current sense measurements using alternating measurement paths and obtaining the second phase current sense measurements using alternating measurement paths comprises amplifying outputs of the first and second multiplexers.

18. The motor control method of claim 16, wherein obtaining the first phase current sense measurements using alternating measurement paths and obtaining the second phase current sense measurements using alternating measurement paths comprises digitizing outputs of the first and second multiplexers.

* * * * *